(12) United States Patent
Maeda

(10) Patent No.: US 9,818,504 B2
(45) Date of Patent: Nov. 14, 2017

(54) WIRE HARNESS, ELECTRICAL WIRE PROTECTOR, AND ELECTRICAL WIRE HOLDER

(71) Applicant: Sumitomo Wiring Systems, Ltd., Yokkaichi, Mie (JP)

(72) Inventor: Takamasa Maeda, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/352,815

(22) Filed: Nov. 16, 2016

(65) Prior Publication Data

US 2017/0148542 A1    May 25, 2017

(30) Foreign Application Priority Data

Nov. 20, 2015    (JP) ................. 2015-227357

(51) Int. Cl.
| | |
|---|---|
| *H01B 7/00* | (2006.01) |
| *H01B 7/17* | (2006.01) |
| *H02G 3/04* | (2006.01) |
| *H01R 13/58* | (2006.01) |
| *H02G 15/007* | (2006.01) |

(52) U.S. Cl.
CPC ............ *H01B 7/0045* (2013.01); *H01B 7/17* (2013.01); *H01R 13/5812* (2013.01); *H02G 3/0468* (2013.01); *H02G 15/007* (2013.01)

(58) Field of Classification Search
CPC ............ H01R 13/5812; H02G 3/0468; H02G 15/007; H01B 7/0045; H01B 7/17
USPC ........................................... 174/68.3
See application file for complete search history.

(56) References Cited

U.S. PATENT DOCUMENTS 4,360,962 A * 11/1982 Suzuki ............... H01B 7/0045
29/56.6
2015/0101842 A1    4/2015 Han

FOREIGN PATENT DOCUMENTS

JP        2013241143 A    12/2013

* cited by examiner

*Primary Examiner* — Dhirubhai R Patel
(74) *Attorney, Agent, or Firm* — Reising Ethington, P.C.

(57) ABSTRACT

A wire harness including: an electrically conducting path including an electrical wire having a front end portion to which a terminal fitting is fixed; a corrugated tube configured to enclose the electrical wire; a rubber boot that is attached to a front end portion of the corrugated tube and is configured to enclose the electrical wire; and an electrical wire holder that is provided with: a holding part configured to hold the electrical wire; and a locking part configured to be locked to a circumferential surface of the corrugated tube. It is possible to stabilize the positional relationship between the front end portion of the electrically conducting path and the front end portion of the rubber boot by holding the electrical wire with the electrical wire holder and locking the electrical wire holder to the circumferential surface of the corrugated tube.

10 Claims, 14 Drawing Sheets

WIRE HARNESS, ELECTRICAL WIRE PROTECTOR, AND ELECTRICAL WIRE HOLDER

This application claims the benefit of Japanese Application No. JP2015-227357, filed on Nov. 20, 2015, the contents of which are hereby incorporated by reference in their entirety.

FIELD

The present invention relates to a wire harness, an electrical wire protector, and an electrical wire holder.

BACKGROUND

JP 2013-241143A discloses a wire harness that protects an electrically conducting path provided with an electrical wire, by enclosing the electrically conducting path with a corrugated tube and a rubber boot. A front end portion of the electrically conducting path is housed within a connector. A base end portion of the rubber boot for waterproofing is attached to a front end portion of the corrugated tube, and a front end portion of the rubber boot is fitted onto the connector.

SUMMARY

In the above-described conventional wire harness, the front end portion of the electrically conducting path and the front end portion of the rubber boot are both attached to the connector, and the electrically conducting path is configured to be displaceable within the corrugated tube and the rubber boot in the axial direction relative to the corrugated tube and the rubber boot. Therefore, the positional relationship between the front end portion of the electrically conducting path and the front end portion of the rubber boot is not stable, and workability when attaching the electrically conducting path and the rubber boot to the connector is not good. Thus, there is a need for improvements.

The present design has been made in view of the above-described situation, and aims to stabilize the positional relationship between the electrically conducting path and the rubber boot.

A first aspect of the design is a wire harness including:

an electrically conducting path including an electrical wire having a front end portion to which a terminal fitting is fixed;

a corrugated tube configured to enclose the electrical wire;

a rubber boot that is attached to a front end portion of the corrugated tube and is configured to enclose the electrical wire; and an electrical wire holder that is provided with: a holding part configured to hold the electrical wire; and a locking part that is locked to a circumferential surface of the corrugated tube.

A second aspect of the design is an electrical wire protector including:

a corrugated tube configured to enclose an electrical wire having a front end portion to which a terminal fitting is fixed;

a rubber boot that is attached to a front end portion of the corrugated tube and is configured to enclose the electrical wire; and an electrical wire holder that is provided with: a holding part configured to hold the electrical wire; and a locking part that is locked to a circumferential surface of the corrugated tube.

A third aspect of the design is an electrical wire holder that constitutes an electrical wire protector together with: a corrugated tube configured to enclose an electrical wire having a front end portion to which a terminal fitting is fixed; and a rubber boot that is attached to a front end portion of the corrugated tube and is configured to enclose the electrical wire, the electrical wire holder including:

a holding part configured to hold the electrical wire; and a locking part configured to be locked to a circumferential surface of the corrugated tube.

With the first to third configurations, it is possible to stabilize the positional relationship between the front end portion of the electrically conducting path and the front end portion of the rubber boot by holding the electrical wire with the electrical wire holder and locking the electrical wire holder to the circumferential surface of the corrugated tube.

DRAWINGS

DESCRIPTION

In the first aspect, the electrical wire holder may include a tube-shaped main body that is configured to enclose the electrical wire, the holding part may be cantilever-shaped protruding in an axial direction from the tube-shaped main body, and the holding part and the electrical wire may be fixed together using an adhesive tape, the electrical wire being disposed along the holding part. This configuration makes it easy to perform the task of holding the electrical wire with the holding part.

In the first aspect, the holding part may include a dislodgment prevention part that is formed on a protruding end portion of the holding part and that protrudes in a direction that is opposite to a contact area of the holding part that is configured to come into contact with the electrical wire. With this configuration, the adhesive tape is prevented from being displaced toward the front end of the holding part.

In the first to third aspects, the locking part may have a groove shape or a rib shape, and may be configured to be locked to the circumferential surface of the corrugated tube. With this configuration, it is possible to lock the locking part to an existing corrugated tube.

In the first and second aspects, the electrical wire holder may include: a tube-shaped main body that is configured to enclose the electrical wire; and an elastically bendable part that constitutes a portion of the tube-shaped main body and is configured to be elastically displaceable in a radial direction, and the locking part may be formed on the elastically deformable part. With this configuration, even if the corrugated tube is continuous along the entire circumference, it is easy to perform the task of locking the locking part to the circumferential surface of the corrugated tube.

In the first and second aspects, the locking part may be configured to be locked to an inner circumferential surface of the corrugated tube, and a base end portion of the rubber boot may be fitted onto an area of the corrugated tube, the area corresponding to the locking part. With this configuration, the corrugated tube is sandwiched between the locking part and the rubber boot in the radial direction, and is unlikely to deform in the radial direction. Therefore, it is possible to reliably hold the corrugated tube, the locking part, and the rubber boot in the state of being attached together.

In the third aspect may further include: a tube-shaped main body that is configured to enclose the electrical wire; and an elastically bendable part that constitutes a portion of the tube-shaped main body and is configured to be elastically displaceable in a radial direction, wherein the locking part may be formed on the elastically bendable part. With this configuration, even if the corrugated tube is continuous along the entire circumference, it is easy to perform the task of locking the locking part to the circumferential surface of the corrugated tube.

First Embodiment

Figure 1:
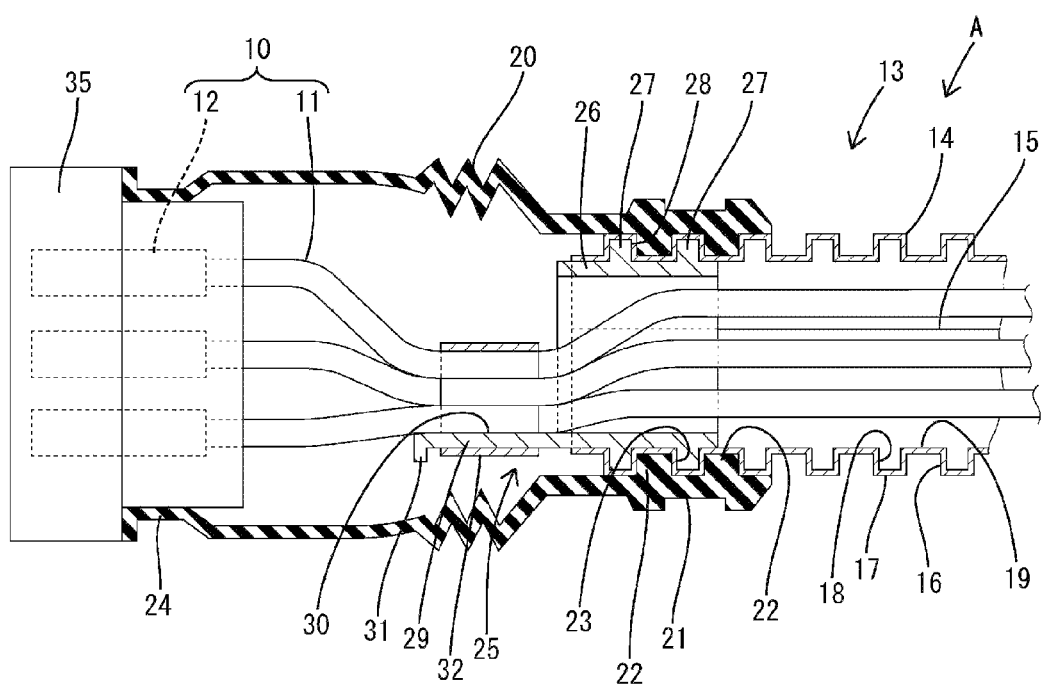
FIG. 1 is a cross-sectional view of a wire harness according to a first embodiment.
Figure 2:
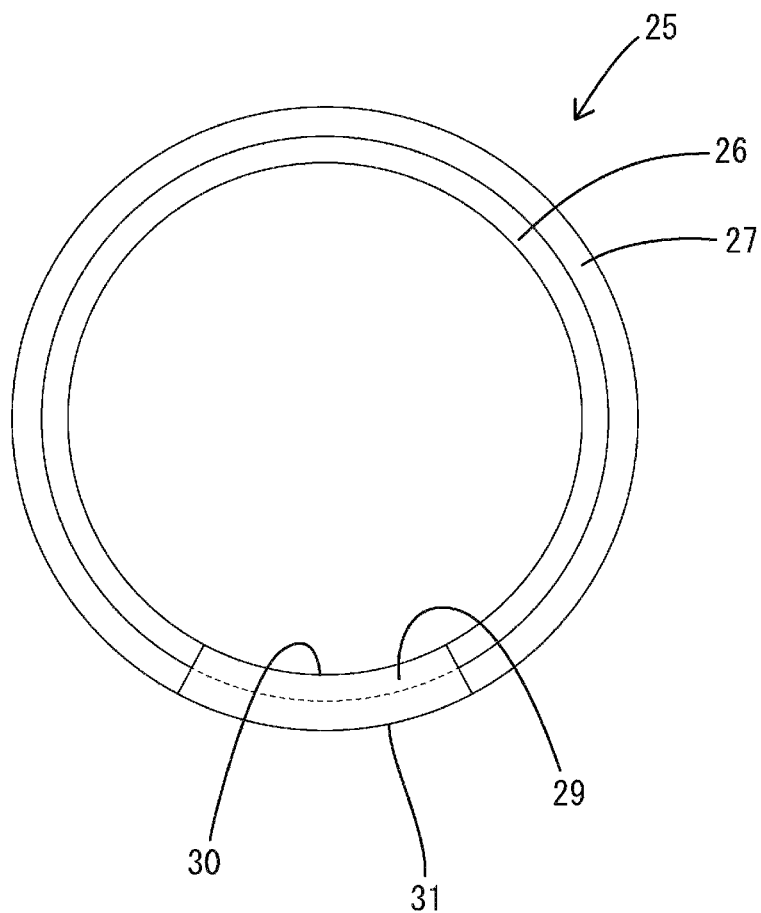
FIG. 2 is a front view of an electrical wire holder.
Figure 3:
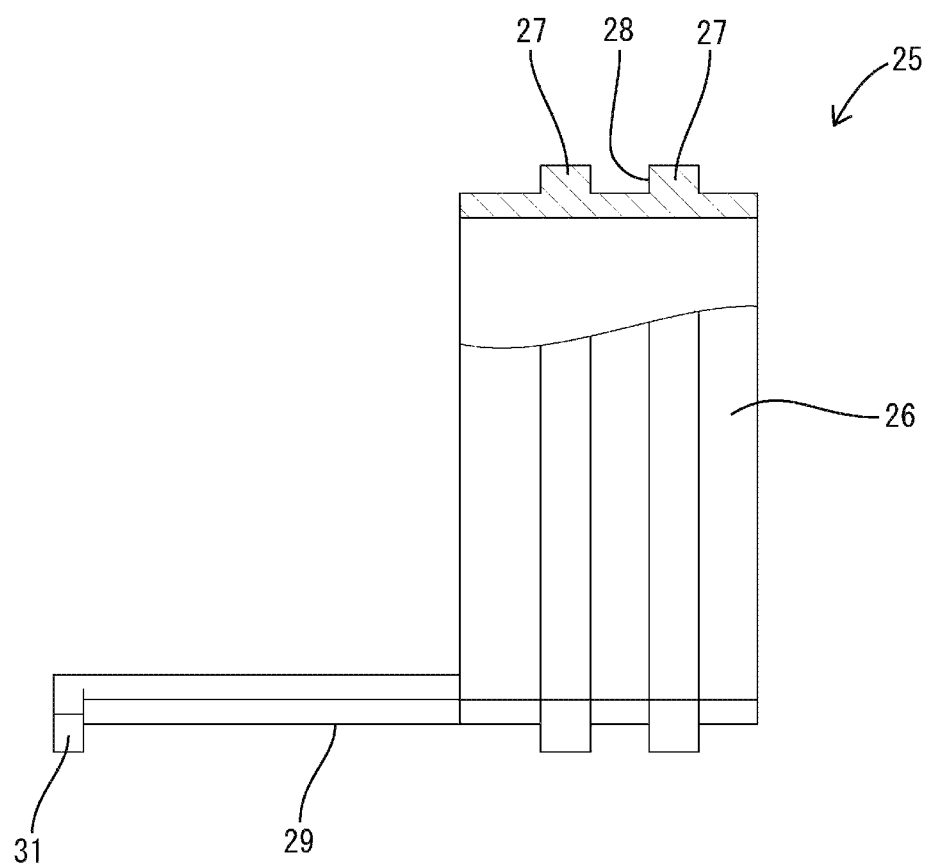
FIG. 3 is a partially cut-out side view of the electrical wire holder.
Figure 4:
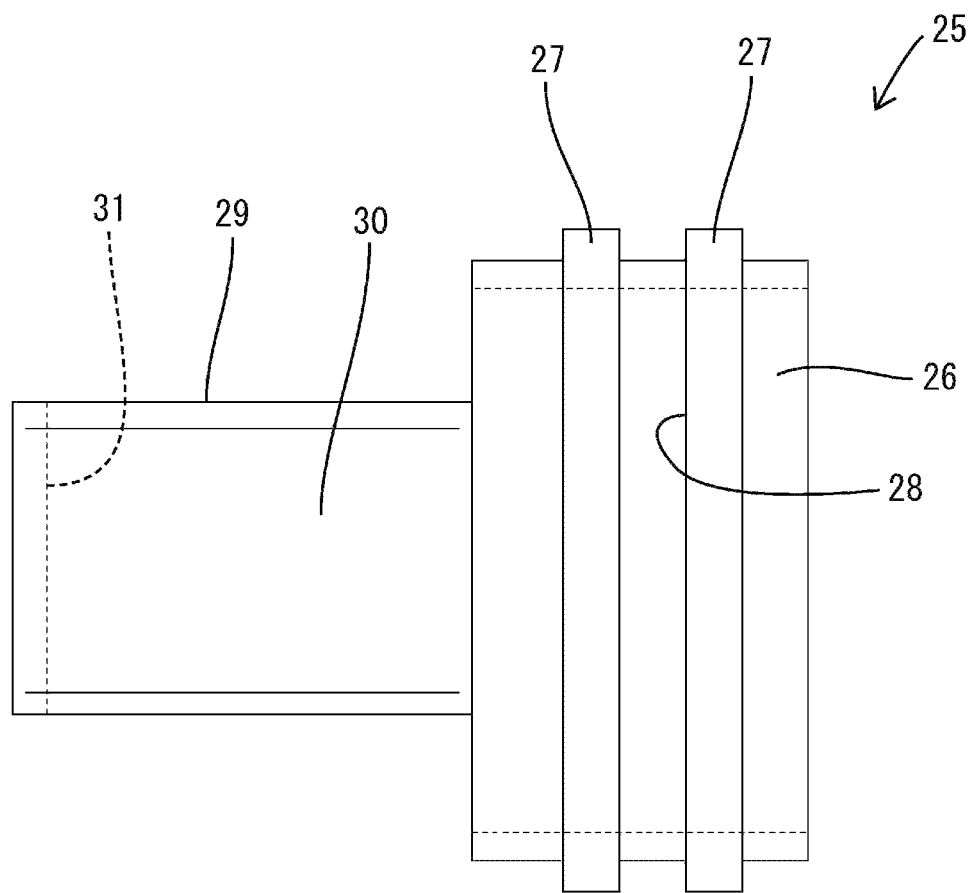
FIG. 4 is a plan view of the electrical wire holder.
Figure 5:
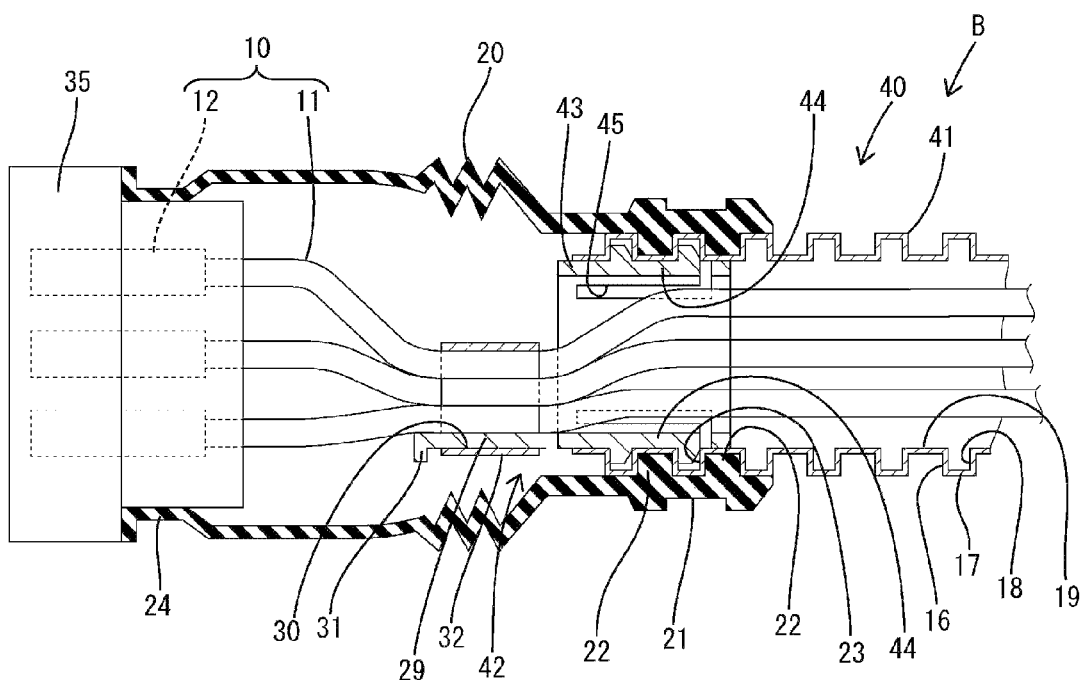
FIG. 5 is a cross-sectional view of a wire harness according to a second embodiment.
Figure 6:
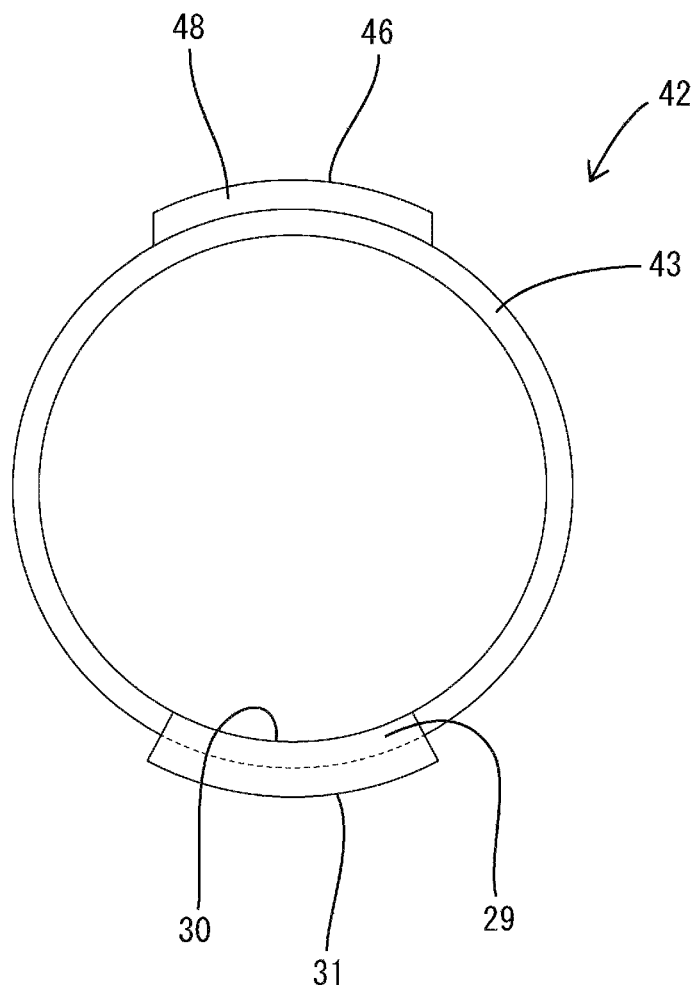
FIG. 6 is a front view of the electrical wire holder.
Figure 7:
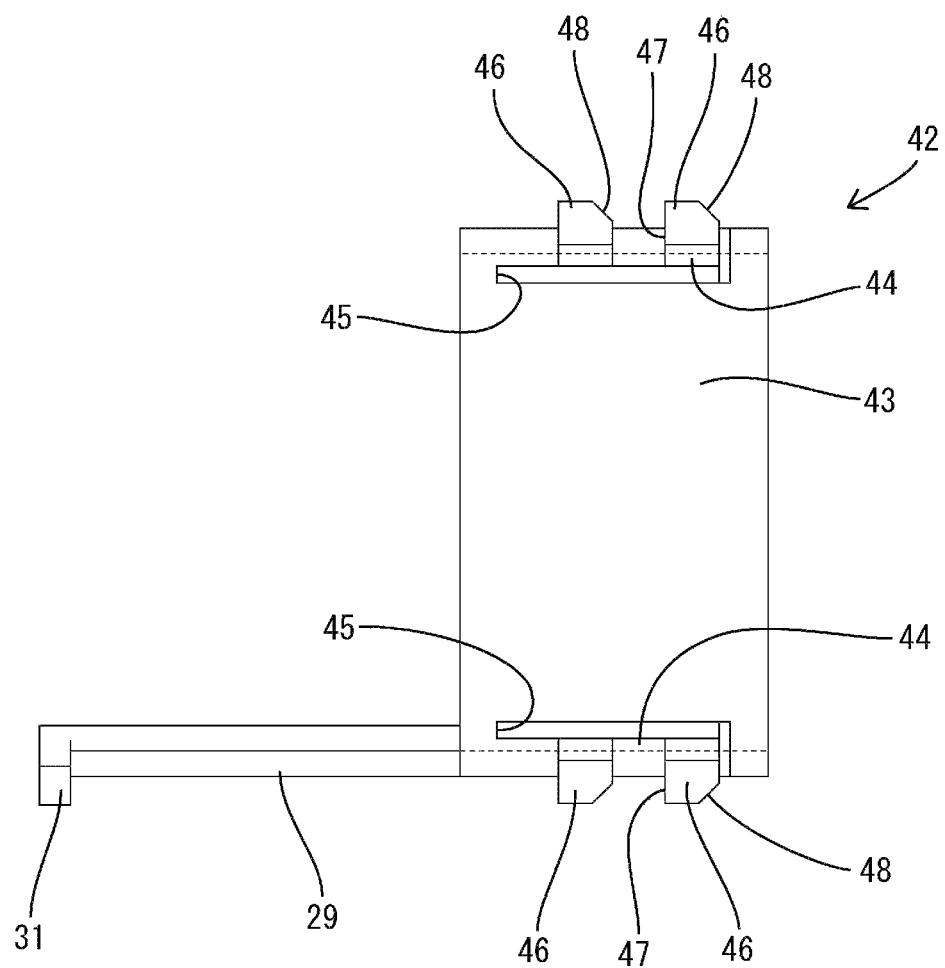
FIG. 7 is a side view of the electrical wire holder.
Figure 8:
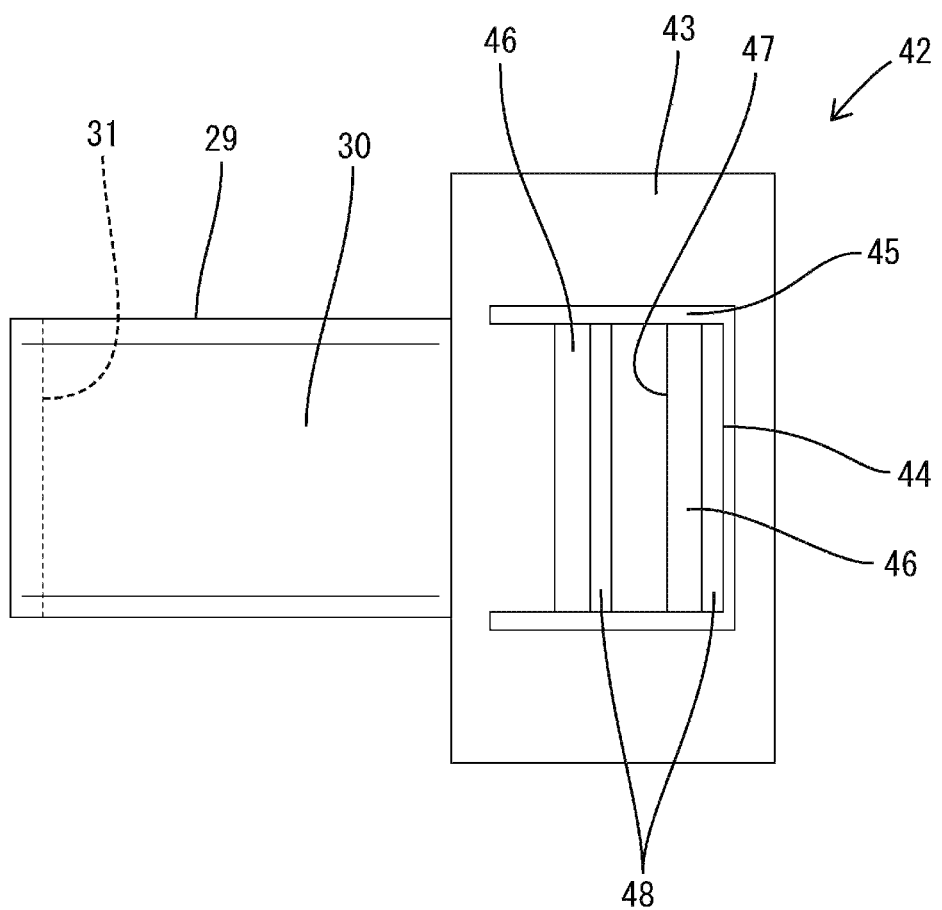
FIG. 8 is a plan view of the electrical wire holder.
Figure 9:
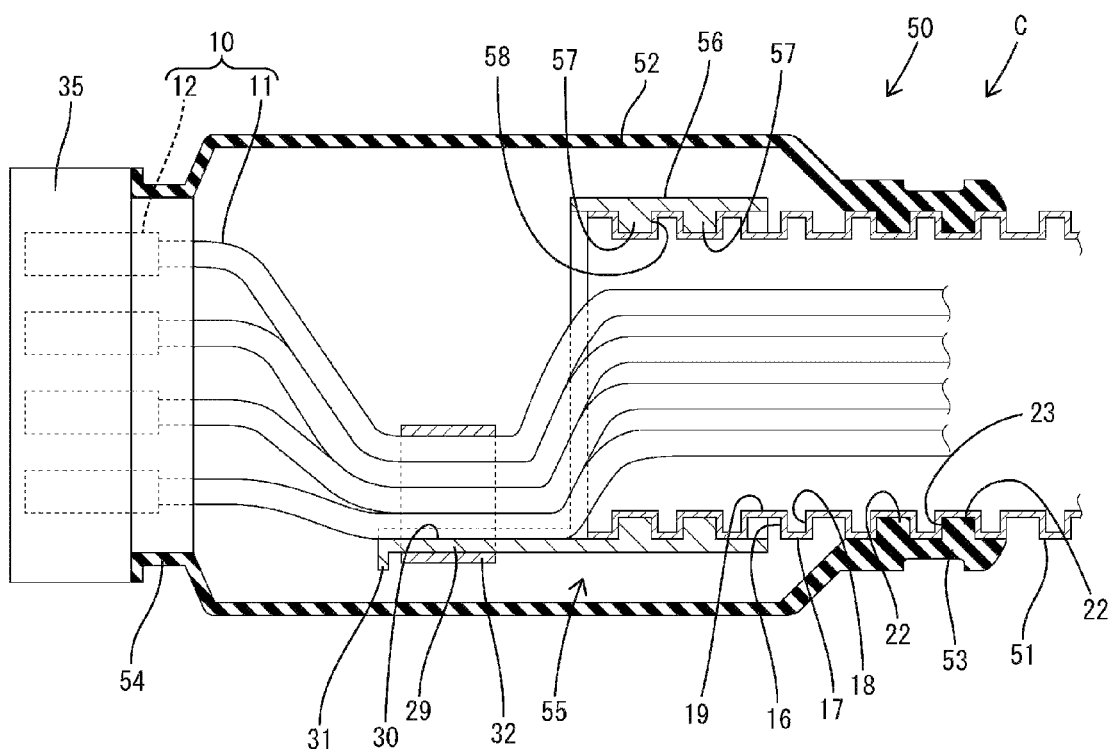
FIG. 9 is a cross-sectional view of a wire harness according to a third embodiment.

The following describes a first embodiment with reference to FIGS. 1 to 4. As shown in FIG. 1, a wire harness A according to the first embodiment includes: a plurality of electrically conducting paths 10; and an electrical wire protector 13. The front end portions of the electrically conducting paths 10 and the front end portion of the electrical wire protector 13 are configured to be attached to the connector 35, in the state of being positioned at predetermined positions in terms of the axial direction.

The electrically conducting paths 10 each include: an electrical wire 11 of a well-known form, in which a core is enclosed with an insulation coating; and a terminal fitting 12 of a well-known form, which is fixed to the front end portion of the electrical wire 11 so as to be electrically conductive. The terminal fitting 12 is configured to be housed within a terminal housing (not shown) formed inside the connector 35, at a predetermined position.

The electrical wire protector 13 has the function of protecting the plurality of electrical wires 11 by enclosing all the electrical wires 11 together. The electrical wire protector 13 includes: a corrugated tube 14 made of synthetic resin; a rubber boot (sleeve) 20; and an electrical wire holder 25. The corrugated tube 14 has a cylindrical shape overall, and is flexible and elastic. The corrugated tube 14 is provided with a cut (split line) 15 extending along the axial direction, and therefore it is possible to elastically deform the corrugated tube 14 by spreading the cut 15 to increase its diameter, or by overlapping edge portions along the cut 15 to reduce the diameter.

The outer circumferential surface of the corrugated tube 14 is provided with a plurality of outer circumferential surface grooves 16 formed along the circumferential direction and a plurality of outer circumferential surface protrusions 17 formed along the circumferential direction, which are arranged one after the other in the axial direction. The inner circumferential surface of the corrugated tube 14 is provided with a plurality of inner circumferential surface grooves 18 formed along the circumferential direction and a plurality of inner circumferential surface protrusions 19 formed along the circumferential direction, which are arranged one after the other in the axial direction. The outer circumferential surface grooves 16 and the inner circumferential surface protrusions 19 are in a back-to-back positional relationship in the radial direction, and the outer circumferential surface protrusions 17 and the inner circumferential surface grooves 18 are in a back-to-back positional relationship in the radial direction.

The rubber boot 20 has a tube shape, and functions as a waterproofing means. The inner circumferential surface of a base end portion 21 of the rubber boot 20 is provided with a plurality of fitting protrusions 22 that are to be fitted into the outer circumferential surface grooves 16 of the corrugated tube 14, and a plurality of fitting grooves 23 that are to be fitted onto the outer circumferential surface protrusions 17 of the corrugated tube 14, which are arranged one after the other in the axial direction. The front end portion of the rubber boot 20 is formed as a terminal fitting portion 24 that is to be fitted onto the outer circumferential surface of the connector 35 in a liquid-tight state.

The electrical wire holder 25 is made of synthetic resin, and has the function of positioning the electrically conducting paths 10 (the electrical wires 11) in terms of the axial direction relative to the corrugated tube 14. The electrical wire holder 25 is a single component including a tube-shaped main body 26 having an approximately cylindrical shape, a plurality of locking ribs 27 ("a locking part" recited in the claims), a locking groove 28 ("a locking part" recited in the claims), and a holding part 29.

The tube-shaped main body 26 is continuous along the entire circumference, and is hardly elastically deformable to change its diameter. The outer diameter of the tube-shaped main body 26 is approximately equal to the inner diameter of the inner circumferential surface protrusions 19 of the corrugated tube 14. The plurality of locking ribs 27 are formed on the outer circumferential surface of the tube-shaped main body 26. The locking ribs 27 protrude from the outer circumferential surface of the tube-shaped main body 26 and extend in the circumferential direction, and are continuous along the entire circumference. The plurality of locking ribs 27 are arranged in the axial direction with a pitch that is equal to the pitch of the inner circumferential surface grooves 18. An area between adjacent locking ribs 27 on the outer circumferential surface of the tube-shaped main body 26 is the locking groove 28 that extends in the circumferential direction.

The holding part 29 has the function of holding all the plurality of electrical wires 11 together. The holding part 29 is cantilever-shaped extending in the axial direction from, out of the two edge portions of the tube-shaped main body 26 in the axial direction, the edge portion that faces the connector 35. The shape of the holding part 29 in a front view is a circular arc shape that is continuous with and flush with the inner circumferential surface and the outer circumferential surface of the tube-shaped main body 26. The inner circumferential surface of the holding part 29 is a contact area 30 that is configured to come into contact with the electrical wires 11. A dislodgment prevention part 31 is formed on a protruding end portion (the end portion that is opposite the tube-shaped main body 26) of the holding part 29. The dislodgment prevention part 31 is disposed along the front end edge of the protruding end portion of the holding part 29, and protrudes in a rib shape toward the outer circumferential surface side (opposite the contact area 30).

Next, the procedure for manufacturing the wire harness A according to the first embodiment is described. First, a plurality of electrically conducting paths 10 (electrical wires 11) are inserted into the corrugated tube 14. At this time, it is possible to house the electrically conducting paths 10 within the corrugated tube 14 by widening the cut 15, or by inserting the electrically conducting paths 10 into the corrugated tube 14 from one end portion of the corrugated tube 14. Subsequently, the front end portions of the electrically conducting paths 10 are inserted into the tube-shaped main body 26, and the bundle of electrical wires 11 is disposed along the contact area 30 of the electrical wire holder 25, outside the corrugated tube 14. Here, the electrical wires 11 are positioned relative to each other such that the plurality of terminal fitting 12 have the same positional relationship as when housed within the connector 35. The holding part 29 and the plurality of electrical wires 11 that are bundled together are fixed together by winding an adhesive tape 32 around them. Thus, the plurality of electrically conducting paths 10 are held by the electrical wire holder 25.

After positioning and holding the plurality of electrical wires 11 (electrically conducting paths 10) using the electrical wire holder 25, the electrical wire holder 25 is attached to the front end portion of the corrugated tube 14. Here, the corrugated tube 14 is deformed to increase its diameter, and only the tube-shaped main body 26 of the electrical wire holder 25 is housed within the corrugated tube 14. Then, the locking groove 28 and the locking ribs 27 of the electrical wire holder 25 are respectively locked to a given inner circumferential surface protrusion 19 and given inner circumferential surface grooves 18 of the corrugated tube 14. As a result of the locking, the corrugated tube 14 and the electrical wire holder 25 are restricted from being relatively displaced in the axial direction, and the terminal fittings 12 (the front end portions of the electrically conducting paths 10) are positioned relative to the front end portion of the corrugated tube 14 in the axial direction.

After the electrical wire holder 25 and the electrically conducting paths 10 are attached to the corrugated tube 14, the base end portion 21 of the rubber boot 20 is fitted onto the outer circumferential surface of the front end portion of the rubber boot 20. Here, the fitting protrusions 22 and the fitting grooves 23 of the rubber boot 20 are relatively locked to given outer circumferential surface grooves 16 and given outer circumferential surface protrusions 17 of the corrugated tube 14. As a result of the locking, the corrugated tube 14 and the rubber boot 20 are restricted from being relatively displaced in the axial direction. Then, the terminal fitting portion 24 of the rubber boot 20 is positioned in terms of the axial direction relative to the front end portion of the corrugated tube 14 and the terminal fittings 12 (the front end portions of the electrically conducting paths 10). Thereafter, the terminal fittings 12 are housed within the connector 35, and the terminal fitting portion 24 of the rubber boot 20 is fitted onto the connector 35. Thus, the wire harness A is connected to the connector 35.

As described above, the wire harness A according to the first embodiment includes: the electrically conducting paths 10 in which the terminal fittings 12 are fixed to the front end portions of the electrical wires 11; and the electrical wire protector 13. The electrical wire protector 13 includes: the corrugated tube 14 that encloses the electrical wires 11; the rubber boot 20 that is attached to the front end portion of the corrugated tube 14 and encloses the electrical wires 11; and the electrical wire holder 25. In other words, the electrical wire holder 25 constitutes the electrical wire protector 13 together with: the corrugated tube 14 that encloses the electrical wires 11 each having a front end portion to which a terminal fitting 12 is fixed; and the rubber boot 20 that is attached to the front end portion of the corrugated tube 14 and encloses the electrical wires 11.

The electrical wire holder 25 includes: the holding part 29 that holds the electrical wires 11; the locking parts (the locking ribs 27 and the locking groove 28) for locking to the circumferential surface of the corrugated tube 14. With this configuration, it is possible to stabilize the positional relationship between the front end portions of the electrically conducting paths 10 and the front end portion of the rubber boot 20 by holding the electrical wires 11 with the electrical wire holder 25 and locking the electrical wire holder 25 to the circumferential surface of the corrugated tube 14.

The electrical wire holder 25 includes the tube-shaped main body 26 that encloses the electrical wires 11. The holding part 29 is cantilever-shaped protruding from the tube-shaped main body 26 in the axial direction. The electrical wires 11 are disposed along the holding part 29, and the holding part 29 and the electrical wires 11 are fixed together with the adhesive tape 32. This configuration makes it easy to perform the task of holding the electrical wires 11 with the holding part 29. Also, since the dislodgment prevention part 31 that protrudes in the direction opposite to the contact area 30 that is in contact with the electrical wires 11 is formed on the protruding end portion of the holding part 29, the adhesive tape 32 is prevented from being displaced toward the front end of the holding part 29, or from dislodging from the holding part 29.

The locking groove 28 of the electrical wire holder 25 has a groove shape that can be locked to the inner circumferential surface protrusions 19 on the inner circumferential surface of the corrugated tube 14, and the locking ribs 27 have a rib shape that can be locked to the inner circumferential surface grooves 18 in the inner circumferential surface of the corrugated tube 14. With this configuration, it is possible to lock the locking parts to an existing corrugated tube 14.

Also, the locking groove 28 and the locking ribs 27 are locked to the inner circumferential surface of the corrugated tube 14, and the base end portion 21 of the rubber boot 20 is fitted onto, out of the outer circumferential surface of the corrugated tube 14, areas corresponding to the locking groove 28 and the locking ribs 27 in terms of the axial direction. With this configuration, the front end portion of the corrugated tube 14 is sandwiched between the locking parts (the locking groove 28 and the locking ribs 27) and the rubber boot 20 in the radial direction, and is unlikely to deform in the radial direction. Therefore, it is possible to reliably hold the corrugated tube 14, the locking parts (the locking groove 28 and the locking ribs 27), and the rubber boot 20 in a state in which they are attached together.

Second Embodiment

The following describes a second embodiment with reference to FIGS. 5 to 8. A wire harness B according to the second embodiment has a configuration that is different from the configuration of the above-described first embodiment in: a corrugated tube 41 that is included in an electrical wire protector 40; and a tube-shaped main body 43 and locking parts (locking ribs 46 and a locking groove 47) of an electrical wire holder 42 that is also included in the electrical wire protector 40. The other components are the same as those in the above-described first embodiment. The same components are given the same reference numerals, and the description of their structure, action and effect is omitted.

The corrugated tube 14 in the above-described first embodiment is provided with the cut 15 that extends in the axial direction. However, the corrugated tube 41 according to the second embodiment is not provided with the cut 15. Therefore, the corrugated tube 41 is hardly deformable to increase its diameter.

Considering such a configuration of the corrugated tube 41, the tube-shaped main body 43 included in the electrical wire holder 42 according to the second embodiment is provided with a pair of upper and lower elastically bendable parts 44. The tube-shaped main body 43 is provided with a slit 45 that is approximately U-shaped, and areas that are surrounded by the slit 45 and are elongated in the axial direction are the elastically bendable parts 44. The elastically bendable parts 44 are configured to be elastically displaceable in the radial direction by pivoting about their respective base end portions.

The plurality of locking ribs 46 ("a locking part" recited in the claims) and the locking groove 47 ("a locking part" recited in the claims) are formed on the outer circumferential surface of each of the elastically bendable parts 44. The plurality of locking ribs 46 extend along the circumferential direction, and an area between adjacent locking ribs 46 is a locking groove 47. The locking ribs 46 and the locking groove 47 are formed only on the outer circumferential surfaces of the elastically bendable parts 44. An inclined guide surface 48 that is inclined relative to the axial direction is formed on the outer surface of each locking rib 46.

When the electrical wire holder 42 is attached to the corrugated tube 41, the tube-shaped main body 43 is inserted from the front end side of the corrugated tube 41. During the insertion, the inclined guide surfaces 48 interfere with the opening edge of the front end of the corrugated tube 41, the elastically bendable parts 44 are elastically bent inward in the radial direction, and the locking ribs 46 are accordingly displaced inward in the radial direction. When the electrical wire holder 42 is inserted into the corrugated tube 41 to a predetermined position, the locking ribs 46 are locked to given inner circumferential surface grooves 18, and the locking groove 47 is locked to a given inner circumferential surface protrusion 19. As a result of the locking, the electrical wire holder 42 and the front end portions of the electrically conducting paths 10 are positioned in terms of the axial direction relative to the corrugated tube 41.

In the wire harness B according to the second embodiment, the electrical wire holder 42 includes: the tube-shaped main body 43 that encloses the electrical wires 11; and the elastically bendable parts 44 that constitute a portion of the tube-shaped main body 43 and that are elastically displaceable in the radial direction. Each elastically bendable part 44 is provided with the locking ribs 46 and the locking groove 47. With this configuration, even if the corrugated tube 41 is continuous along the entire circumference, it is easy to perform the task of locking the locking parts (the locking ribs 46 and the locking groove 47) to the circumferential surface of the corrugated tube 41.

Third Embodiment

The following describes a third embodiment with reference to FIGS. 9 to 14. A wire harness C according to the third embodiment has a configuration that is different from the configuration of the above-described first embodiment in a corrugated tube 51, a rubber boot 52, and an electrical wire holder 55 that are included in an electrical wire protector 50. The other components are the same as those in the above-described first embodiment. The same components are given the same reference numerals, and the description of their structure, action and effect is omitted.

Unlike the first embodiment, the corrugated tube 51 according to the third embodiment does not have a cut extending in the axial direction. Therefore, the corrugated tube 51 is hardly elastically deformable to reduce its diameter. The rubber boot 52 according to the third embodiment has a larger size in the axial direction than the rubber boots 20 according to the first embodiment and the second embodiment. In other words, the distance between a base end portion 53 of the rubber boot 52 and a terminal fitting portion 54 at a front end of the rubber boot 52 is longer than the distance between the base end portion 21 and the terminal fitting portion 24 of the rubber boots 20 according to the first embodiment and the second embodiment. The rubber boot 52 is elongated in order to prevent the rubber boot 52 from interfering with the electrical wire holder 55 fitted onto the outer circumferential surface of the corrugated tube 51.

Figure 10:
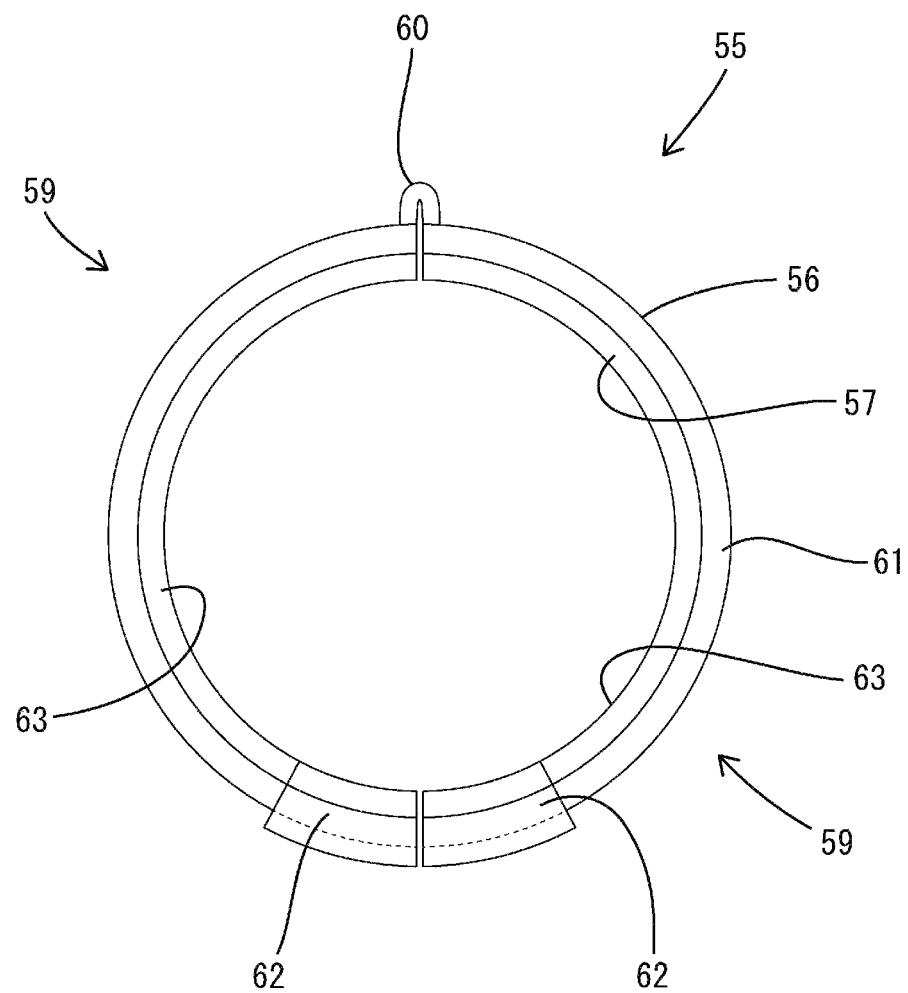
FIG. 10 is a front view of the electrical wire holder.
Figure 11:
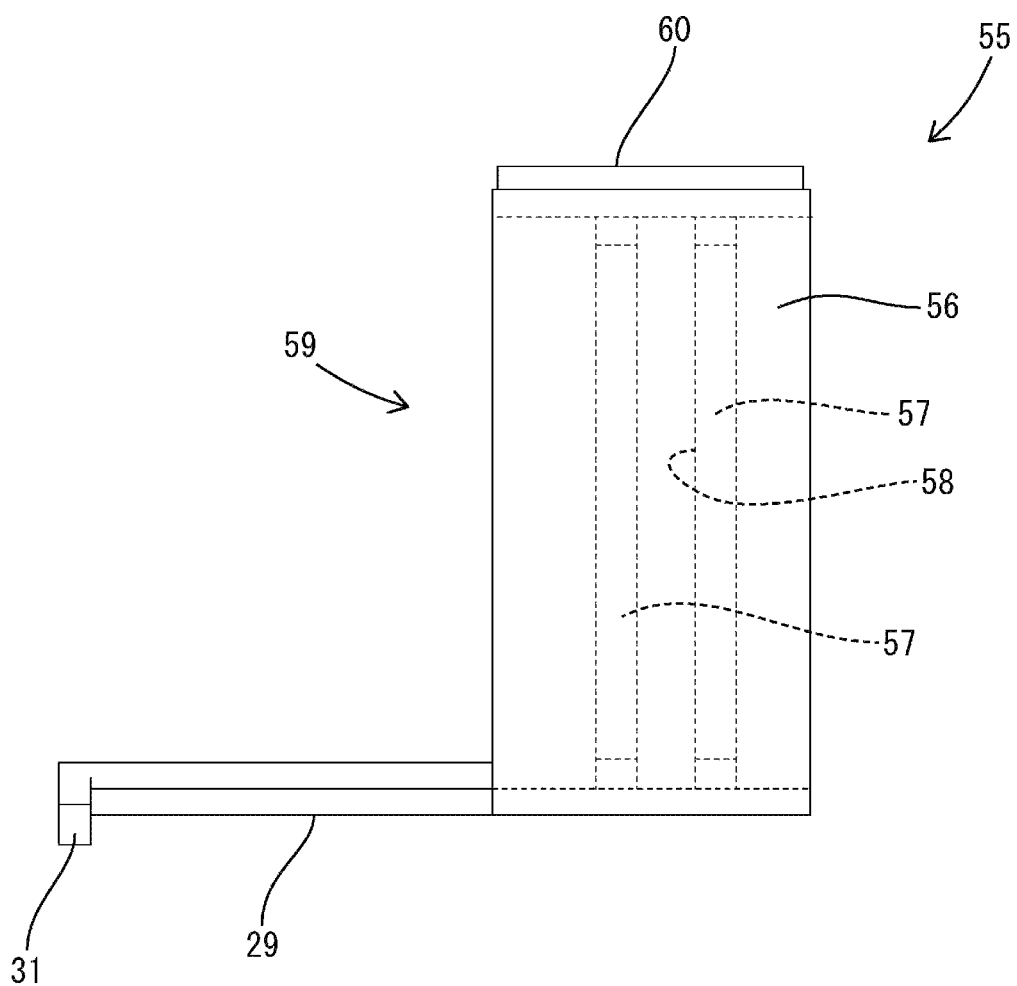
FIG. 11 is a side view of the electrical wire holder.
Figure 12:
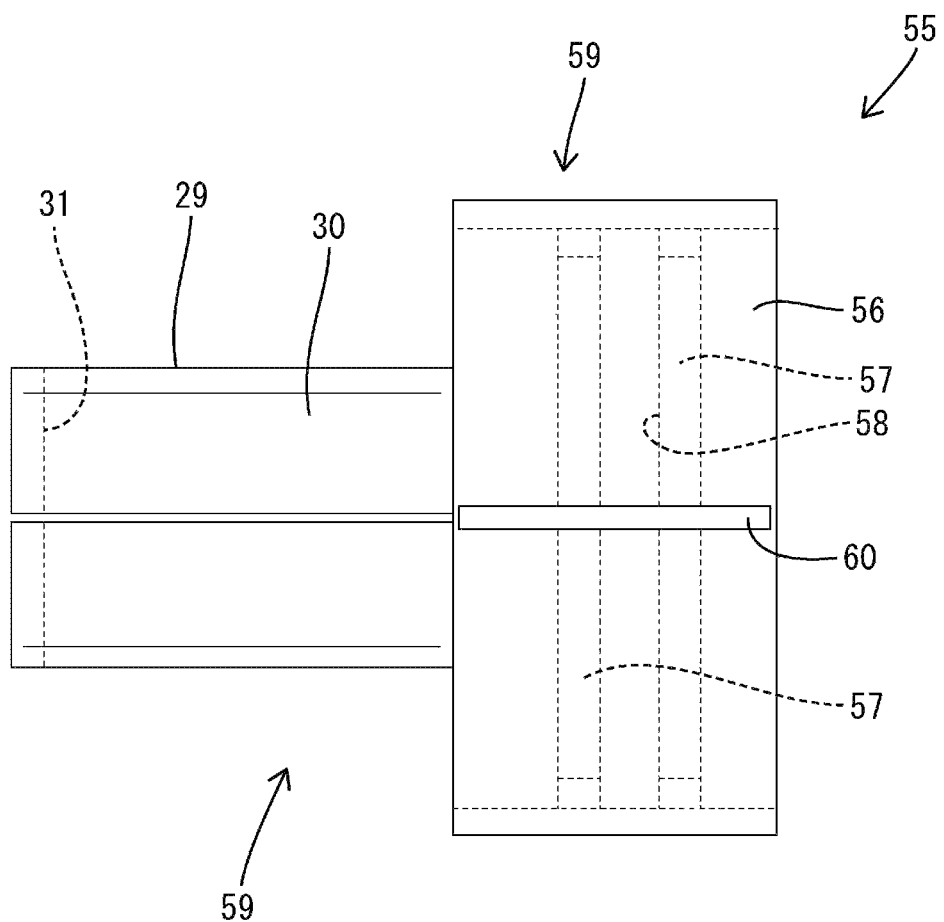
FIG. 12 is a plan view of the electrical wire holder.
Figure 13:
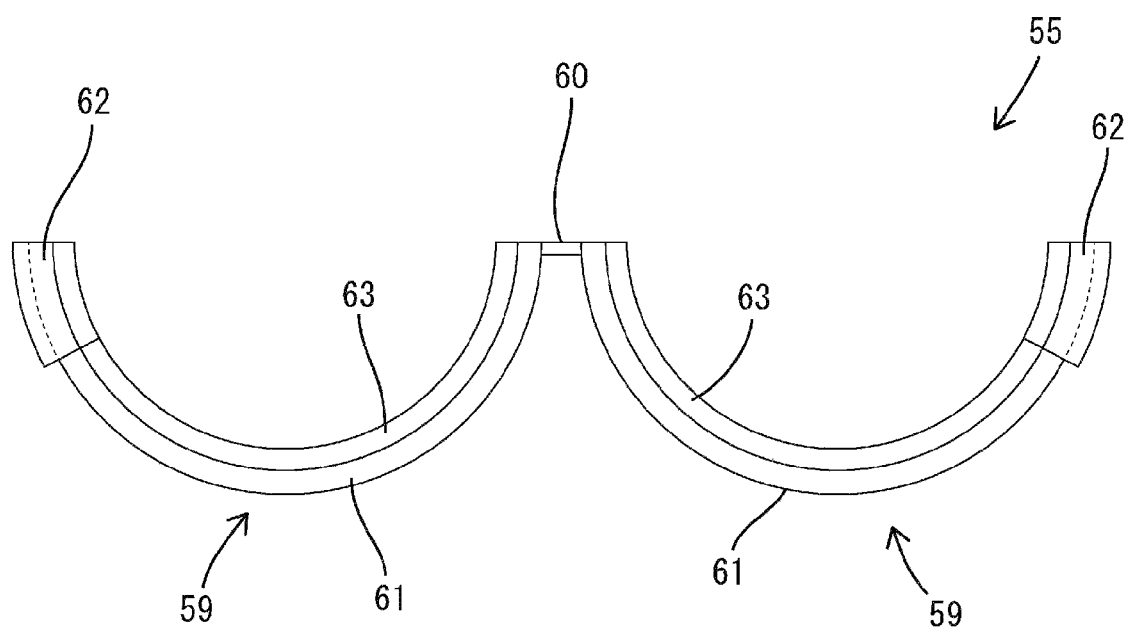
FIG. 13 is a front view showing a situation before the electrical wire holder has been assembled.
Figure 14:
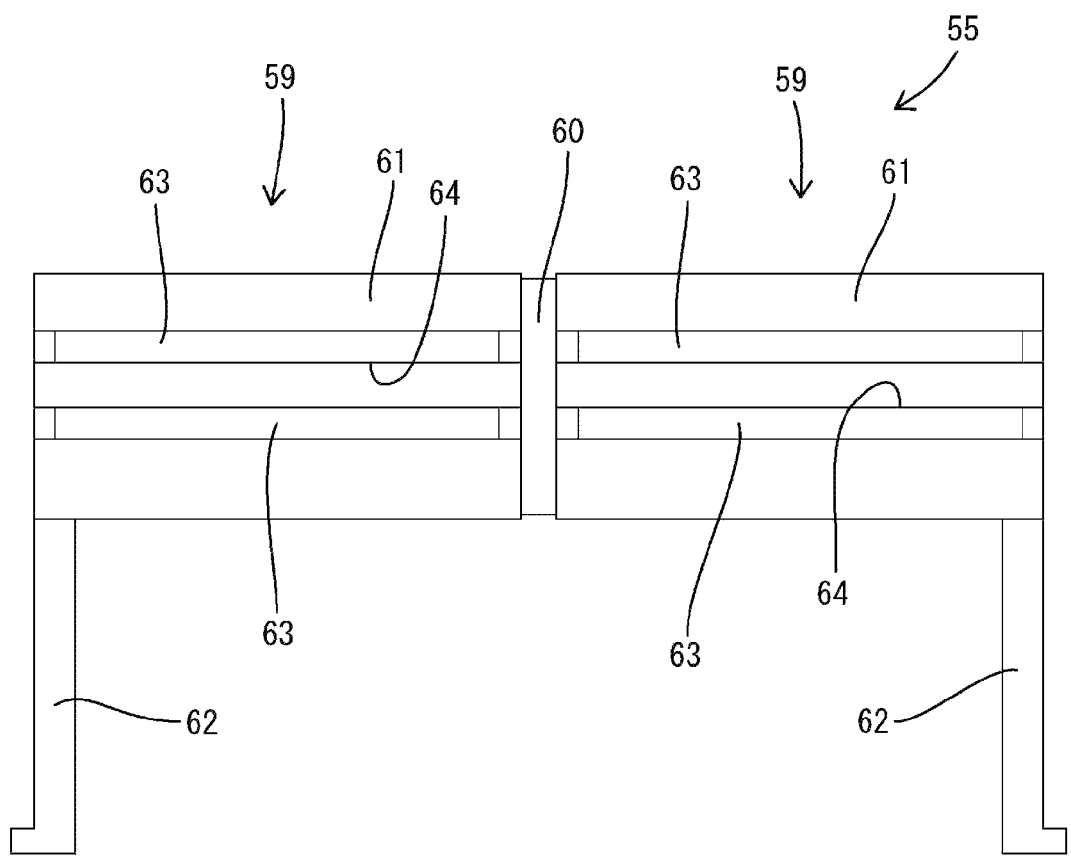
FIG. 14 is a plan view showing a situation before the electrical wire holder has been assembled.

As shown in FIGS. 10 to 12, in terms of the functions, the electrical wire holder 55 according to the third embodiment includes: a tube-shaped main body 56; and the holding part 29 that is the same as that in the first embodiment. The plurality of locking ribs 57 ("a locking part" recited in the claims) and the locking groove 58 ("a locking part" recited in the claims) are formed on the inner circumferential surface of the tube-shaped main body 56. The locking ribs 57 protrude from the tube-shaped main body 56 inward in the radial direction and extend in the circumferential direction, and are continuous along the entire circumference. The plurality of locking ribs 57 are arranged at intervals in the axial direction. An area between adjacent locking ribs 57 is the locking groove 58.

In terms of the structure, the electrical wire holder 55 includes: a pair of halved members 59 that are symmetrical; and a hinge 60 that couples the halved members 59 together. The halved members 59 each include a halved cylindrical portion 61 and an extension portion 62. A rib component 63 that constitutes half the circumferential surface area of a locking rib 57 and a groove component 64 that constitutes half the circumferential surface area of the locking groove 58 are formed on the inner circumferential surface of each halved cylindrical portion 61. The extension portions 62 is cantilever-shaped protruding in the axial direction from the respective end portions of the halved cylindrical portions 61, the end portions being located opposite the hinge 60 in the circumferential direction of the halved cylindrical portions 61. Each extension portion 62 constitutes a half area of the holding part 29 and a half area of the dislodgment prevention part 31 in the circumferential direction.

When the two halved members 59 are assembled by being pivoted about the hinge 60, one tube-shaped main body 56 is constituted by the two halved cylindrical portions 61, one locking rib 57 is constituted by the two rib components 63, one locking groove 58 is constituted by the two groove components 64, and one holding part 29 and one dislodgment prevention part 31 are constituted by the two extension portions 62.

When the electrical wire holder 55 is attached to the corrugated tube 51, one of the halved cylindrical portions 61 is fitted onto the corrugated tube 51 in a situation where the halved members 59 are open (before the halved members 59 have been assembled), and the rib component 63 and the groove component 64 are respectively fitted to an outer circumferential surface groove 16 and an outer circumferential surface protrusion 17. Subsequently, the other halved cylindrical portion 61 is fitted onto the corrugated tube 51 in the same manner as the aforementioned halved cylindrical portion 61, and thus the two halved members 59 are assembled. In the situation where the halved members 59 have been assembled, the plurality of electrical wires 11 have been inserted into the tube-shaped main body 56.

The electrical wire holder 55 in the situation where the two halved members 59 have been assembled, the locking ribs 57 and the locking groove 58 are locked to the outer circumferential surface grooves 16 and an outer circumferential surface protrusion 17, and are positioned in terms of the axial direction relative to the corrugated tube 51. After assembly, the electrical wires 11 are placed on the contact area 30 of the holding part 29, and in the same manner as in the first embodiment, the electrical wires 11 are held by the holding part 29 by winding the adhesive tape 32.

After the electrical wires 11 are held by the electrical wire holder 55, the base end portion 53 of the rubber boot 52 is fitted onto the corrugated tube 51. Here, the fitting protrusions 22 and the fitting grooves 23 of the rubber boot 52 are fitted to the outer circumferential surface grooves 16 and the outer circumferential surface protrusions 17 of the corrugated tube 51. The position on the outer circumferential surface of the corrugated tube 51 to which the rubber boot 52 is locked is displaced in the axial direction (in the direction opposite to the front end side) from the position to which the tube-shaped main body 56 is locked. That is to say, the rubber boot 52 encloses the entire electrical wire holder 55 including the tube-shaped main body 56, and the outer circumferential surface of the tube-shaped main body 56 and the inner circumferential surface of the rubber boot 52 are in a positional relationship in which they directly face each other. In other words, the corrugated tube 51 is not interposed between the outer circumferential surface of the tube-shaped main body 56 and the inner circumferential surface of the rubber boot 52.

Other Embodiments

The present invention is not limited to the description above or the embodiments described with reference to the drawings, and the following embodiments are also included in the technical scope of the present invention, for example.

In the above-described first to third embodiments, the electrical wires and the holding part are fixed together by winding an adhesive tape. However, in order to fix the electrical wires to the holding part, it is also possible to provide the holding part with a portion that elastically sandwiches or encloses the electrical wires.

In the above-described first to third embodiments, the locking parts are locked to the circumferential surface of the existing corrugated tube. However, it is also possible to use a specialized corrugated tube that is different from existing corrugated tubes in the shape of the circumferential surface.

In the above-described first and second embodiments, the base end portion of the rubber boot is fitted onto the area on the corrugated tube that corresponds to the locking parts. However, such a configuration is not essential, and the positions to which the locking parts are locked and the portions onto which the rubber boot are fitted may be displaced in the axial direction.

The configuration in which the locking parts are formed on the elastically bendable parts according to the above-described second embodiment may be applied to the electrical wire holder that is locked to the outer circumferential surface of the corrugated tube according to the third embodiment.

In the above-described first to third embodiments, the tube-shaped main body is continuous along the entire circumference, and hardly elastically deformable to change its diameter. However, it is also possible to form a slit extending in the axial direction in the tube-shaped main body so that the tube-shaped main body is elastically deformable to change its diameter.

In the above-described first and second embodiments, only the tube-shaped main body of the electrical wire holder is housed within the corrugated tube. However, such a configuration is not essential, and the holding part of the electrical wire holder may also be housed within the corrugated tube.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A wire harness comprising:
   an electrically conducting path including an electrical wire having a front end portion to which a terminal fitting is fixed;
   a corrugated tube enclosing the electrical wire;
   a rubber boot that is attached to a front end portion of the corrugated tube and encloses the electrical wire; and
   an electrical wire holder that is provided with: a holding part that holds the electrical wire, and a locking part;
   wherein the locking part has a groove shape or a rib shape and locks to the circumferential surface of the corrugated tube.

2. The wire harness according to claim 1,
   wherein the electrical wire holder includes a tube-shaped main body that is capable of enclosing the electrical wire,
   the holding part is cantilever-shaped protruding in an axial direction from the tube-shaped main body, and
   the holding part and the electrical wire are fixed together using an adhesive tape, the electrical wire being disposed along the holding part.

3. The wire harness according to claim 2,
   wherein the holding part includes a dislodgment prevention part that is formed on a protruding end portion of the holding part and that protrudes in a direction that is opposite to a contact area of the holding part that is capable of coming into contact with the electrical wire.

4. The wires harness according to claim 1,
   wherein the electrical wire holder includes:

a tube-shaped main body that is capable of enclosing the electrical wire; and an elastically bendable part that constitutes a portion of the tube-shaped main body and is capable of being elastically displaceable in a radial direction, and the locking part is formed on the elastically bendable part.

5. The wire harness according to claim 1, wherein the locking part is capable of being locked to an inner circumferential surface of the corrugated tube, and a base end portion of the rubber boot is fitted onto an area of the corrugated tube, the area corresponding to the locking part.

6. An electrical wire protector comprising:

a corrugated tube capable of enclosing an electrical wire having a front end portion to which a terminal fitting is fixed;

a rubber boot that is attached to a front end portion of the corrugated tube and is capable of enclosing the electrical wire; and an electrical wire holder that is provided with: a holding part capable of holding the electrical wire, and a locking part;

wherein the locking part has a groove shape or a rib shape and locks to the circumferential surface of the corrugated tube.

7. The electrical wire protector according to claim 6, wherein the electrical wire holder includes:

a tube-shaped main body that is capable of enclosing the electrical wire; and an elastically bendable part that constitutes a portion of the tube-shaped main body and is capable of being elastically displaceable in a radial direction, and the locking part is formed on the elastically bendable part.

8. The electrical wire protector according to claim 6, wherein the locking part is capable of being locked to an inner circumferential surface of the corrugated tube, and a base end portion of the rubber boot is fitted onto an area of the corrugated tube, the area corresponding to the locking part.

9. An electrical wire holder that constitutes an electrical wire protector together with: a corrugated tube capable of enclosing an electrical wire having a front end portion to which a terminal fitting is fixed; and a rubber boot that is attached to a front end portion of the corrugated tube and is capable of enclosing the electrical wire, the electrical wire holder comprising:

a holding part capable of holding the electrical wire; and a locking part capable of being locked to a circumferential surface of the corrugated tube, wherein the locking part has a groove shape or a rib shape and locks to the circumferential surface of the corrugated tube.

10. The electrical wire holder according to claim 9, further comprising:

a tube-shaped main body that is capable of enclosing the electrical wire; and an elastically bendable part that constitutes a portion of the tube-shaped main body and is capable of being elastically displaceable in a radial direction, wherein the locking part is formed on the elastically bendable part.

* * * * *